United States Patent [19]

Gubbay et al.

[11] Patent Number: 4,659,548
[45] Date of Patent: Apr. 21, 1987

[54] FABRICATION OF METAL MATRIX COMPOSITE MIRROR

[75] Inventors: Jacob D. Gubbay, Winchester; Edward J. Hall, Lexington, both of Mass.

[73] Assignee: The United States of America as represented by the Secretary of the Navy, Washington, D.C.

[21] Appl. No.: 829,378

[22] Filed: Feb. 13, 1986

[51] Int. Cl.⁴ .............................................. B22F 3/26
[52] U.S. Cl. ........................................ 419/10; 419/26; 419/27; 419/48; 419/49; 419/60; 427/162; 350/320; 350/641; 350/642; 75/230; 428/409
[58] Field of Search ...................... 350/320, 641, 642; 427/162; 419/10, 26, 27, 48, 49, 60; 75/230; 428/409

[56] References Cited

U.S. PATENT DOCUMENTS

| | | | |
|---|---|---|---|
| 4,364,763 | 12/1982 | Rennerfelt | 350/609 |
| 4,386,825 | 6/1983 | Stalcup | 350/610 |
| 4,443,059 | 4/1984 | Wells | 350/610 |
| 4,451,119 | 5/1984 | Meyers et al. | 350/609 |

*Primary Examiner*—Stephen J. Lechert, Jr.
*Attorney, Agent, or Firm*—Prithvi C. Lall; Arthur A. McGill; Michael J. McGowan

[57] ABSTRACT

Fabrication of a high precision mirror using a discontinuous metal matrix composite is described. A metal matrix composite (MMC) is obtained by using one of the three methods described herein or any other method. The MMC material so obtained is machined to form a mirror substrate which is then coated and the coating so obtained is converted into the mirror surface. The mirror so obtained has better characteristics over the conventional high precision beryllium mirrors used for this purpose and is fabricated out of a nontoxic material which is cheaper and more easily available than the beryllium metal.

12 Claims, 6 Drawing Figures

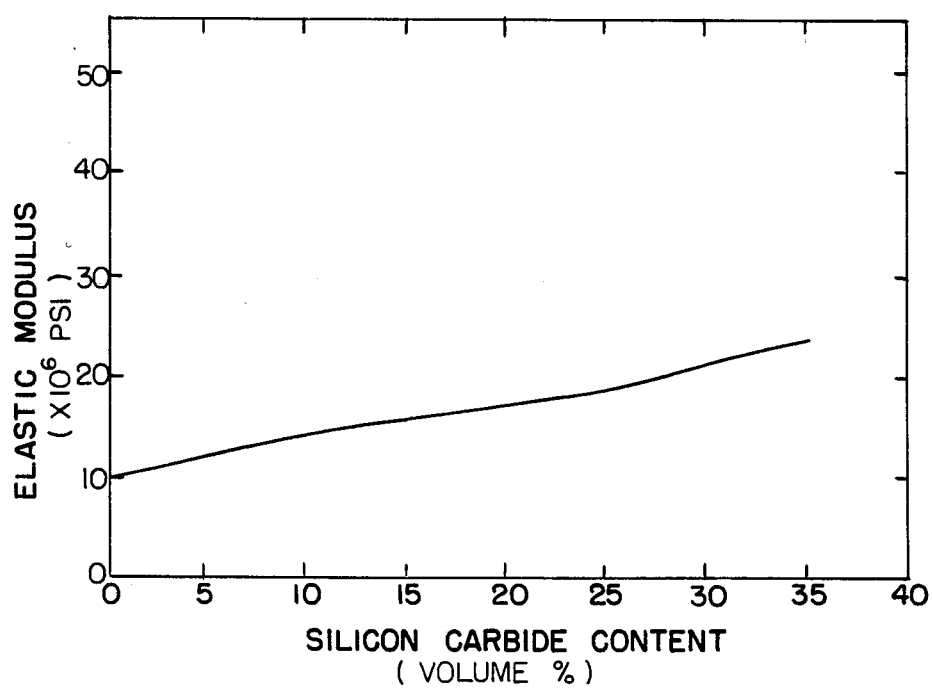
F I G. 6

4,659,548

FABRICATION OF METAL MATRIX COMPOSITE MIRROR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to optical mirrors and more particularly to the fabrication of a high quality mirror from a metal matrix composite (MMC) material.

(2) Background of the Invention

The use of mirrors in high precision optical systems has been known for a long time. Critical to the successful application of these mirrors are material properties such as dimensional stability, low weight, high thermal conductivity, high specific heat, high stiffness, suitable coefficient of thermal expansion, etc. Different applications require various combinations of these properties. For example, many aerospace applications require low weight, high stiffness and high dimensional stability. Beryllium is particularly attractive in this regard. After trying different possible choices beryllium has been used for fabricating such mirrors. They have been fabricated by consolidating beryllium powder by vacuum hot pressing (VHP) into a block which is then machined into the desired shape of a mirror. However, beryllium is a very expensive metal and has limited sources of availability. Furthermore, beryllium is toxic and has very limited near-net-shaping (cast or forged) capability. A high precision beryllium mirror is therefore machined out of a beryllium block, thus wasting most of the beryllium by converting it into beryllium chips. Besides, beryllium is toxic and requires a special machine shop to meet rigid Occupational Safety and Health Administration (OSHA) requirements for safety which adds to its expense. It is thus desirable to fabricate precision optical mirrors out of a material which is nontoxic and cheaper than the beryllium metal.

SUMMARY OF THE INVENTION

The objects and advantages of the present invention are accomplished by using a discontinuous-reinforced metal matrix composite (herein designated as MMC) including an aluminum alloy matrix reinforced with ceramic silicon carbide particulate for the fabrication of a highly dimensionally stable mirror with desirable characteristics. The MMC material selected possesses the unique quality of tailorable properties obtained by varying the ratio of ceramic reinforcement to metal matrix in the blend. The MMC material may be fabricated by such methods as the following: (1) blending a metal powder with a ceramic powder and consolidating by hot isostatic pressing (HIP), (2) combining a suitable molten metal with the ceramic powder in a homogeneous manner and then casting into suitable shapes or forms, (3) blending a metal powder with a ceramic powder and consolidating by vacuum hot pressing (VHP). These methods can yield the required mirror shape directly or by additional steps involving conventional metalworking technology such as forging, welding, spinning, etc. to obtain a suitable near-net-shape mirror substrate. The substrate is then machined into a finished shape, followed by coating with a suitable coating which is converted into a mirror surface by using techniques such as diamond turning or lapping and polishing. The mirror surface is then preserved with a protective coating.

An object of subject invention is to fabricate an MMC mirror for aerospace applications and the like.

Another object of subject invention is to fabricate a dimensionally stable mirror out of an MMC material which has tailorable properties.

Still another object of subject invention is to fabricate an MMC mirror out of a discontinuous-reinforced particulate metal matrix composite to replace beryllium mirrors in precision mirror applications.

Still another object of subject invention is to fabricate a precision mirror from a discontinuous-reinforced particulate metal matrix composite to replace aluminum, copper and other metal mirrors with another material which has higher stiffness-to-weight ratio and lower coefficient of expansion. The latter requirement is necessary to minimize thermal mismatch stresses in most precision equipment.

Another object of subject invention is to fabricate a precision mirror made out of a nontoxic material.

Another object of subject invention is to fabricate a high precision mirror out of a material such as an MMC which is less expensive than materials such as beryllium metal which has been used in the past.

Another object of subject invention is to use an MMC material whose composition is tailored to match the thermal expansion coefficient of the coating, so as to avoid thermal mismatch stresses and instability in the mirror during thermal excursions.

Another object of subject invention is to fabricate a high precision mirror out of a material such as MMC which has multiple sources of supply unlike beryllium.

Other objects, advantages and novel features of the invention will become apparent from the following detailed description thereof when considered in conjunction with the accompanying drawings wherein:

BRIEF DESCRIPTION OF THE DRAWINGS

FIG. 6 is a graphical representation indicating the changes in one property characteristic of an MMC material as a function of the silicon carbide content therein.

DESCRIPTION OF THE PREFERRED EMBODIMENT

Figure 1:
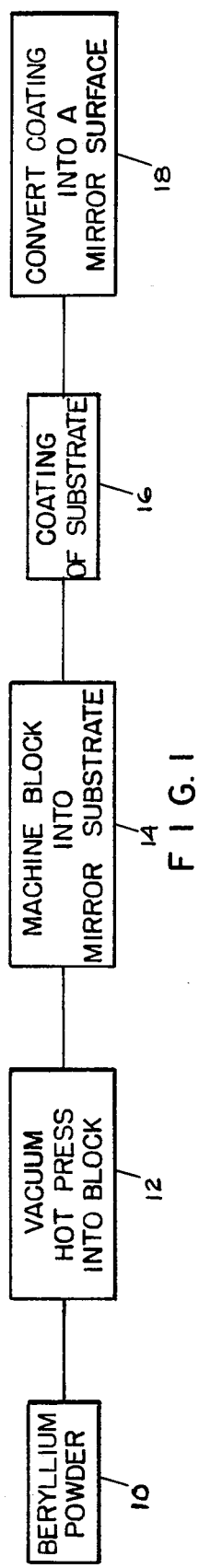
FIG. 1 is a block diagram of a method which has been used in the past to fabricate high precision mirrors out of beryllium metal.
Figure 2:
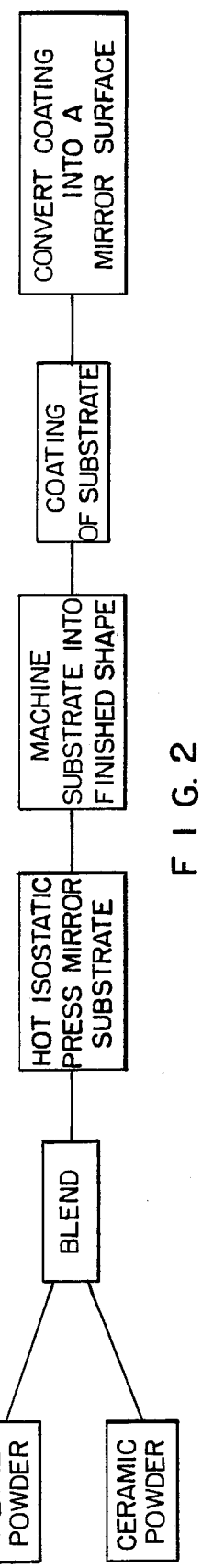
FIG. 2 is a block diagram showing the fabrication process of a high precision mirror according to one of the methods as described in subject patent application.
Figure 3:
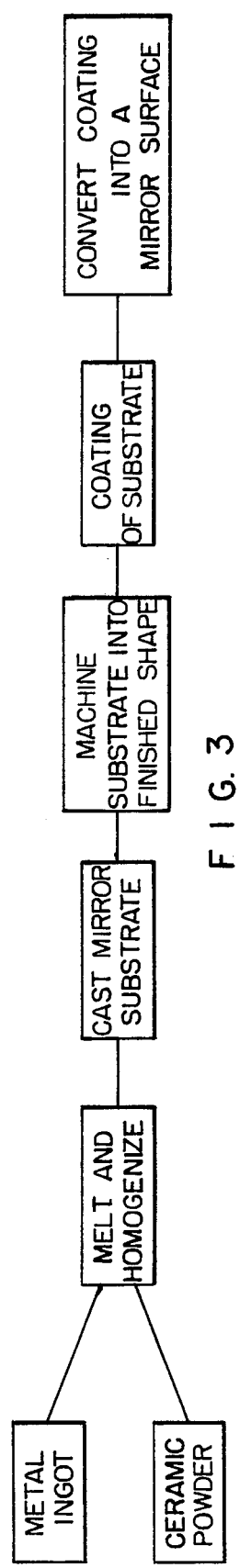
FIG. 3 is another method of fabricating a high precision MMC mirror as described in subject patent application.
Figure 4:
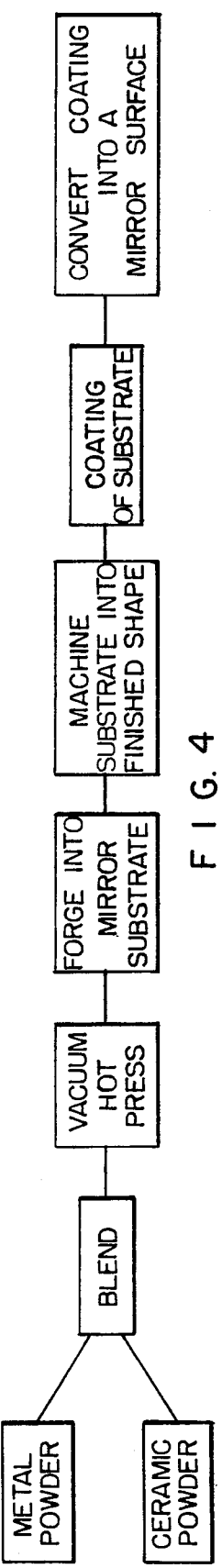
FIG. 4 is a block diagram of still another method described herein to fabricate a high precision mirror made out of an MMC material.
Figure 5:
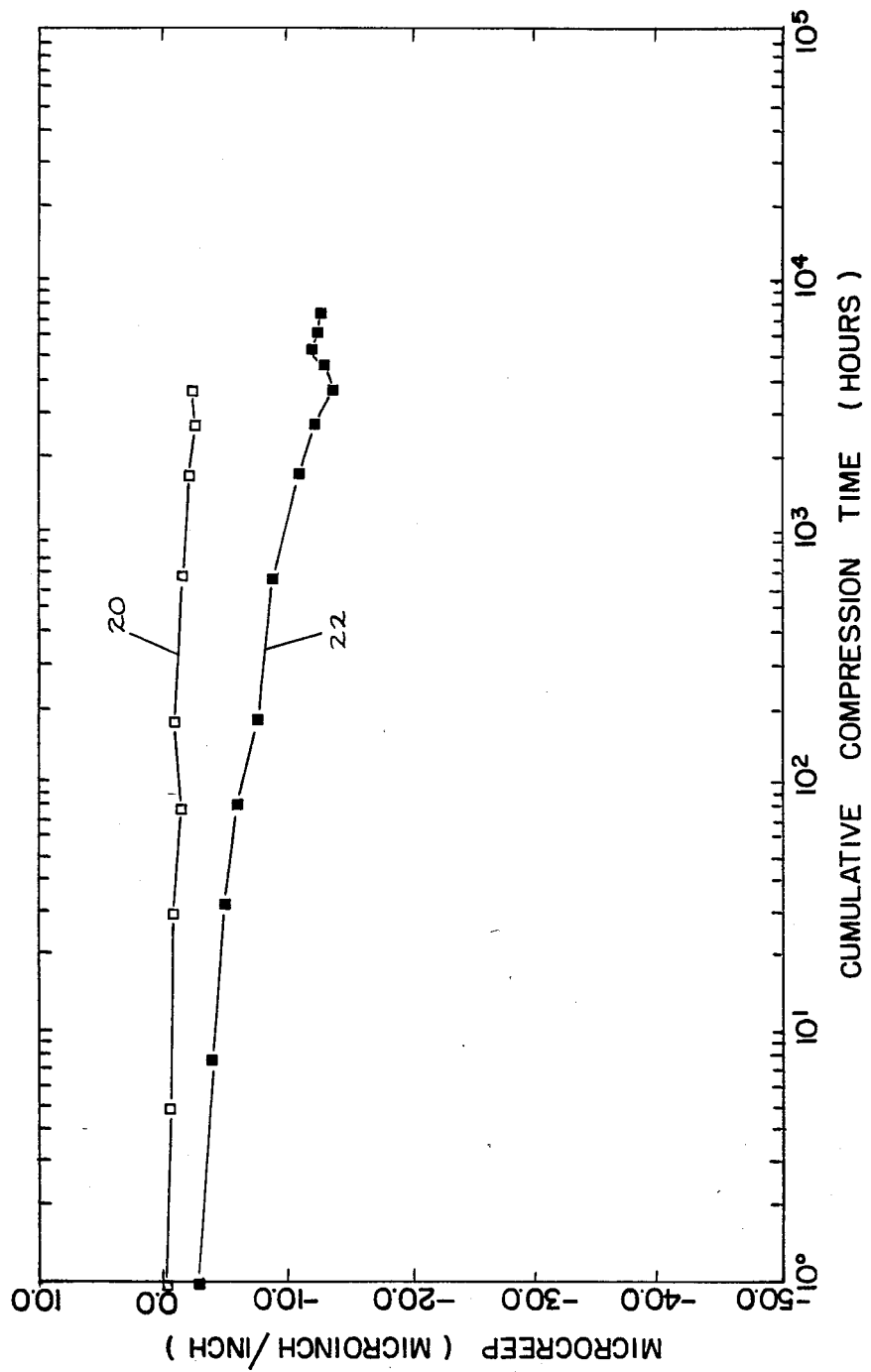
FIG. 5 is a graphical representation of the dimensionally stable properties of a beryllium specimen as compared to a sample of a preferred MMC.

Referring to the drawings wherein like reference characters designate identical or corresponding parts throughout various figures, FIG. 1 shows in block diagram form a conventional and prior art method of fabricating a high precision mirror using beryllium. As shown by step designated as 10, beryllium powder is vacuum hot pressed (VHP) into a block as shown in step 12. The block is then machined in a special machine shop to form a mirror substrate as indicated by step 14. The substrate so obtained and may be then coated as shown by step 16 and the coating or substrate then converted into a mirrored surface as indicated by step 18. It should be noted that this is the conventional method of making beryllium mirrors and the machining and other steps used in the fabrication are to be accomplished in a special machine shop or laboratory because of the toxic nature of beryllium. It should also be noted that beryllium is one of the strategic metals and the sources of obtaining beryllium powder for this purpose are limited which makes the fabrication of a high precision mirror out of beryllium a very expensive undertaking. The three methods used according to the teachings of subject invention for fabricating a mirror out of a discontinuous-refinforced particulate metal matrix composite (MMC) material to replace a high precision beryllium mirror prepared according to the process of FIG. 1 is taught by FIGS. 2–4. The process of FIG. 2 starts with a metal powder and a ceramic powder which are blended and then consolidated by the conventional process of hot isostatic pressing (HIP) to form a near-net-shape mirror substrate. Alternatively, a molten metal is mixed with a ceramic powder, homogenized and then cast into a near-net-shape mirror substrate as shown in FIG. 3. FIG. 4 shows that a metal powder and a ceramic powder are blended together and consolidated by vacuum hot pressing (VHP), then forged into a near-net-shape mirror substrate. It should be noted that the MMC material can be made by methods other than described above without deviating from the teachings of subject invention. The steps used after obtaining a near-net-shape mirror substrate as in the processes shown in FIGS. 2–4 are similar in that the near-net-shape mirror substrate is machined first into a rough shape and then into a finished shape with heat treatments interspersed in between. The finished substrate is then coated and the coating is converted into a mirrored surface. It should be noted that these discontinuous-reinforced metal matrix composites (MMC), including aluminum alloy powder matrix reinforced with ceramic silicon carbide particulate, were investigated to determine their suitability to replace beryllium in optical applications. These MMC materials possessed the unique quality of tailorable properties, obtained by varying the amounts of ceramic reinforcement and metal matrix in the blend. FIG. 5 compares the dimensional stability properties of an MMC material chosen for the fabrication of high precision mirrors as compared to beryllium and is a plot of the cumulative compression time versus microcreep strain (microinch/inch) for an MMC material as shown by curve 20 as compared to the characteristics for beryllium which is shown by curve 22. The composition consisted of MMC of a metal powder of commonly known 2124 aluminum alloy powder reinforced with 30 percent by volume silicon carbide particulate designated as X-0 grade 3 (G-3) The MMC material was further strengthened by heat treatment to an aged condition designated as T-6 for maximum stability. By using a logarithmic time scale in FIG. 5, it was possible to determine the long term microcreep behavior by extrapolation instead of waiting many years for the results. The composition of MMC material can be varied by using different mixture ratios of the ceramic reinforcement and the metal matrix. Table 1 below shows other properties of interest that were measured on the best MMC materiall. FIG. 6 shows the effect of increasing silicon carbide content on the elastic modulus of the MMC sample. Similar effects have been observed with properties important in mirror design such as the coefficient of thermal expansion. As mentioned above, microcreep properties were deterrminned by placing test specimens under compressive loads and measuring the residual microstrain at various time intervals. By using a logarithmic time scale it was possible to determine the long term microcreep rate, i.e., slope of the plot behavior by extrapolation instead of waiting many years for the result. Heat treatment to T-6 condition was performed by heating the specimen to an elevated temperature (920° F. to 930° F.) for sufficient time to allow all the elements to go into solution, followed by quenching into water at a temperature between room temperature and 100° F.

TABLE 1

| PROPERTIES OF MMC SAMPLE-2124-T6 30% X-O (G3) | | | | | | |
|---|---|---|---|---|---|---|
| Average Microyield Strength (MYS) (lb/in.$^2$) | Average Elastic Modulus (lb/in.$^2$ × 10$^6$) | Average Yield Strength (lb/in.$^2$) | Average Tensile Strength (lb/in.$^2$) | Average Total Strain at Fracture | Thermal Expansion ($\alpha$ × 10$^{-6}$/°F.) | Thermal Conductivity (Btu/h/ft/°F.) |
| 17000 | 17.9 | 76000 | 83,000 | 0.89% | 8.1 | 77 |

This was followed by aging at an elevated temperature, preferably 350° F., for sufficient time to harden and strengthen the material. When fully aged, the material is designated as being in the T-6 condition. The heat treatment procedure just described is also used to harden and strengthen conventional aluminum alloys. The heat treating operations were interspersed with the various machining steps so as to minimize the residual stresses from machining. Sometimes, quenching is performed in glycol-water solution to reduce quenching stress and quenching distortion. To reduce residual stresses from machining and quenching even further, a stress relief operation and a stabilization operation were also added during the final machining steps. The stress relief is usually performed at a temperature within 50° F. above and below the aging temperature, and stabilization usually consists of thermally cycling the material between a cold and a warm temperature such as −100° F. and +212° F. Both the stress relief and stabilization processes act to relax the material so as to maintain the stable mirror figure.

It should be further noted that attempts to develop a mirror surface directly on an MMC substrate were unsuccessful due to the presence of the carbide particulate which scratched the surface during the mirror machining operation. A common technique to surmount the problem of a substrate that does not lend itself to providing mirror surfaces directly is to plate it with electroless nickel (a hard metallic coating that obtains its hardness by the presence of nickel phosphide) which presents an ideal surface for lapping and polishing into a mirror surface. There is however a bimetallic effect between substrate and plating when their coefficients of thermal expansion do not match, leading to mirror instability. The MMC substrate blend was selected to avoid this problem since it matched the expansion of the nickel plating which is a very important requirement for mirror plating stability during temperature excursion. The test results showed the success of this effort quite well. The finished mirror surface was then covered with a protective coating such as silicon monoxide to preserve its reflecting properties.

Briefly stated, fabrication of high precision mirrors using MMC materials in order to replace beryllium mirrors is accomplished by using an MMC material with tailorable properties. The high precision MMC mirror can be obtained by any of the three methods outlined previously using (1) a metal powder and a ceramic powder blend which is consolidated by hot isostatic pressing (HIP) to form a near-net-shape mirror substrate, then machined into a final shape, followed by coating of the substrate and converting the coating into a mirror surface (2) a molten metal mixed with a ceramic powder, followed by homogenizing then casting the melt into a near-net-shape mirror substrate which is machined into a finished shape, then coated, followed by converting the coating into a mirror surface; and (3) a metal powder and a ceramic powder which are blended and consolidated by vacuum hot pressing (VHP), followed by forging into a near-net-shape mirror substrate which is then machined into a finished shape. The substrate is coated and converted into a mirror surface. The finished reflecting surface of the precision MMC mirror produced by any of these three methods is then covered with a protective coating such as that of silicon monoxide.

Obviously, many modifications and variations of the present invention are possible in the light of the above teachings. For example, the choice of the MMC material used can be varied depending upon the properties required for the MMC mirror fabricated. Furthermore, the temperatures used in the process can also be varied without deviating from the teachings of subject invention. In addition, the choice of coating for obtaining a reflecting surface can vary depending upon the final requirements for the mirror without deviating from the teachings of subject invention. Furthermore, the MMC material may be obtained by other methods, but the fabrication of a precision mirror from the MMC material is accomplished according to the teachings of subject invention. It is therefore understood that within the scope of the appended claims the invention may be practiced otherwise than as specifically described.

What is claimed is:

1. The method for fabricating a high precision mirror from a near-net-shape mirror substrate of a discontinuous-reinforced metal matrix composite (MMC) material which includes the steps of:
   heat treating the near-net-shape mirror substrate for hardening thereof;
   machining the hardened near-net-shape mirror substrate into a semi-finished mirror substrate thereof;
   heat treating the semi-finished mirror substrate to relieve stress thereof;
   machining the heat treated semi-finished mirror substrate to form a finished mirror substrate thereof;
   applying a coating upon a surface of said finished mirror substrate to form a coated surface thereof;
   converting said coated surface of the finished mirror substrate into a mirror surface; and
   applying a protective coating on the mirror surface of said finished mirror substrate.

2. The method of claim 1 wherein said machining the hardened near-net-shape mirror substrate into a semi-finished mirror substrate includes milling.

3. The method of claim 1 wherein said machining the heat-treated semi-finished substrate to form a finished mirror substrate includes diamond turning.

4. The method of claim 3 wherein said machining step further includes electrodischarge machining (EDM).

5. The method of claim 1 wherein the step of applying a coating upon a surface of said finished mirror substrate to form a coated surface includes nickel plating.

6. The method of claim 5 wherein the step of nickel plating includes using nickel phosphide.

7. The method of claim 5 wherein the step of applying protective coating on the mirror surface includes using silicon monoxide.

8. The method of claim 1 wherein the step of heat treating the near-net-shape mirror substrate for hardening includes heating thereof to an aging temperature of at least 350° F.

9. The method of claim 8 wherein the step of heat treating the semi-finished mirror substrate to relieve stress includes applying temperatures 50° F. above and below the aging temperature.

10. The method of claim 1 wherein the near-net-shape mirror substrate of discontinuous-reinforced metal matrix composite (MMC) is obtained by:
    mixing a metal powder with a ceramic powder to form a blend; and
    consolidating said blend by hot isostatic processing (HIP).

11. The method of claim 1 wherein the near-net-shape mirror substrate of a discontinuous-reinforced metal matrix composite (MMC) is obtained by:
    mixing a metal powder with a ceramic powder to form a blend;
    consolidating said blend by vacuum hot pressing (VHP) to form a block thereof; and
    metalworking of said block.

12. The method of claim 1 wherein the near-net-shape mirror substrate of a discontinuous-reinforced metal matrix composite (MMC) is obtained by:
    mixing a molten metal with a ceramic powder to form an homogenized melt; and
    casting said melt.

* * * * *